(12) United States Patent
Thompson et al.

(10) Patent No.: US 11,320,844 B2
(45) Date of Patent: May 3, 2022

(54) METHODS AND SYSTEM FOR OPERATING AN ELECTRIC POWER DELIVERY DEVICE OF A VEHICLE

(71) Applicant: Ford Global Technologies, LLC, Dearborn, MI (US)

(72) Inventors: Scott Steadmon Thompson, Belleville, MI (US); Nicholas Herhusky, Dearborn, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 16/441,913

(22) Filed: Jun. 14, 2019

(65) Prior Publication Data

US 2020/0393859 A1  Dec. 17, 2020

(51) Int. Cl.
G05D 23/19 (2006.01)
H02M 1/32 (2007.01)
G06F 1/26 (2006.01)
H02M 7/48 (2007.01)

(52) U.S. Cl.
CPC .......... *G05D 23/1917* (2013.01); *G06F 1/26* (2013.01); *H02M 1/32* (2013.01); *H02M 7/48* (2013.01); *H02M 1/327* (2021.05)

(58) Field of Classification Search
CPC ........ G05D 23/1917; G06F 1/26; H02M 7/48; H02M 1/32; H02M 2001/327
See application file for complete search history.

(56) References Cited

U.S. PATENT DOCUMENTS

| | | | |
|---|---|---|---|
| 6,664,751 B1 * | 12/2003 | Gabriel ................. | B60K 6/445 318/599 |
| 7,312,964 B2 | 12/2007 | Tchernobrivets | |
| 8,384,243 B2 * | 2/2013 | Adest ..................... | H02J 3/383 307/43 |
| 2008/0060370 A1 * | 3/2008 | Keene ..................... | B60L 1/003 62/236 |
| 2011/0083449 A1 * | 4/2011 | Louch ............... | H01M 10/6564 62/56 |
| 2012/0047386 A1 * | 2/2012 | Matsui ................... | H02J 3/387 713/340 |
| 2012/0323427 A1 * | 12/2012 | Endo .................... | B60W 20/00 701/22 |
| 2014/0139016 A1 | 5/2014 | Lovercheck et al. | |
| 2014/0311704 A1 * | 10/2014 | Yokoyama .............. | H02K 9/19 165/41 |
| 2015/0192632 A1 | 7/2015 | Crosman, III et al. | |

(Continued)

OTHER PUBLICATIONS

Herhusky, N. et al., "Methods and Systems for Engine Idle Stop," U.S. Appl. No. 16/440,514, filed Jun. 13, 2019, 40 pages.

(Continued)

*Primary Examiner* — Kun Kai Ma
(74) *Attorney, Agent, or Firm* — Geoffrey Brumbaugh; McCoy Russell LLP

(57) ABSTRACT

Systems and methods for operating a vehicle that includes a direct current to alternating current converter is described. In one example, an indication of an air flow restriction of the direct current to alternating current converter is described. The direct current to alternating current converter may supply power to devices that are external to the vehicle.

16 Claims, 5 Drawing Sheets

(56) References Cited

U.S. PATENT DOCUMENTS

| | | | |
|---|---|---|---|
| 2015/0217623 A1* | 8/2015 | Hatakeyama | B60L 58/13 |
| | | | 165/42 |
| 2016/0116511 A1* | 4/2016 | Yang | G01R 19/32 |
| | | | 324/105 |
| 2017/0141613 A1* | 5/2017 | Oshima | H02J 50/90 |
| 2018/0281600 A1* | 10/2018 | Zhou | B60L 53/14 |
| 2018/0366970 A1* | 12/2018 | Zhou | H02J 7/0034 |
| 2019/0198895 A1* | 6/2019 | Morita | H01M 8/04014 |
| 2020/0207227 A1* | 7/2020 | Tan | B60L 53/22 |
| 2020/0309079 A1* | 10/2020 | Watanabe | B60K 6/48 |

OTHER PUBLICATIONS

Herhusky, N. et al., "Methods and System for Reducing a Possibility of Spark Plug Fouling," U.S. Appl. No. 16/444,790, filed Jun. 18, 2019, 43 pages.

Herhusky, N. et al., "Method for Operating a Vehicle Having an Electrical Outlet," U.S. Appl. No. 16/562,287, filed Sep. 5, 2019, 40 pages.

* cited by examiner

METHODS AND SYSTEM FOR OPERATING AN ELECTRIC POWER DELIVERY DEVICE OF A VEHICLE

FIELD

The present description relates to methods and a system for a vehicle that includes a DC to AC converter.

BACKGROUND AND SUMMARY

A vehicle may include a direct current (DC) to alternating current (AC) converter, which may be referred to as a DCAC converter or a DCAC power supply. The DCAC may be supplied DC power via a lower voltage electric energy storage device (e.g., a 12 volt battery) or via a higher voltage electric energy storage device (e.g., a 48 volt battery). The DCAC may output a voltage that may operate AC powered devices. For example, the DCAC may output 120 volts AC or 240 volts at 60 Hertz. The DCAC output may supply power to external computing devices including but not limited to computers, electronic note pads, etc. The external computing devices may not be devices that are included with the vehicle at the time of vehicle purchase. The DCAC may also supply power to phones, lighting devices, entertainment systems, gaming systems, and other AC power consumers. The DCAC may be packaged within the vehicle's passenger compartment so that it is not exposed to external environmental conditions. However, it may be possible for vehicle occupants to reduce an amount of air flow that is directed to cool the DCAC converter by adding objects to the vehicle's passenger compartment or storage areas. Consequently, a temperature of the DCAC may increase to a temperature that is higher than may be desired. Operating the DCAC at higher temperatures may lead to DCAC degradation.

The inventors herein have recognized the above-mentioned issues and have developed a method for operating a vehicle that includes a direct current to alternating current converter, comprising: modeling a temperature of the direct current to alternating current converter via a controller; measuring the temperature of the direct current to alternating current converter via the controller; and generating an indication to clear an air flow path to the direct current to alternating current converter in response to the measured temperature being greater than the modeled temperature for greater than a threshold amount of time.

By generating an indication to clear an air flow path to a direct current to alternating current converter or power supply, it may be possible to provide the technical result of reducing a temperature of the direct current to alternating current converter so that the possibility of degrading performance of the direct current to alternating current converter may be reduced. In addition, mitigating actions may be taken to further reduce the possibility that performance of the direct current to alternating current converter may be degraded. In particular, airflow to floor vents of a climate control system may be increased to provide additional cooling air to a direct current to alternating current converter that may be mounted under a vehicle seat.

The present description may provide several advantages. In particular, the approach may reduce the possibility of DCAC converter degradation. Further, the approach may provide mitigating actions that may help to cool the DCAC converter, thereby reducing the possibility of converter degradation. In addition, the approach may allow vehicle occupants to improve air flow to a DCAC converter so that the possibility of converter degradation may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
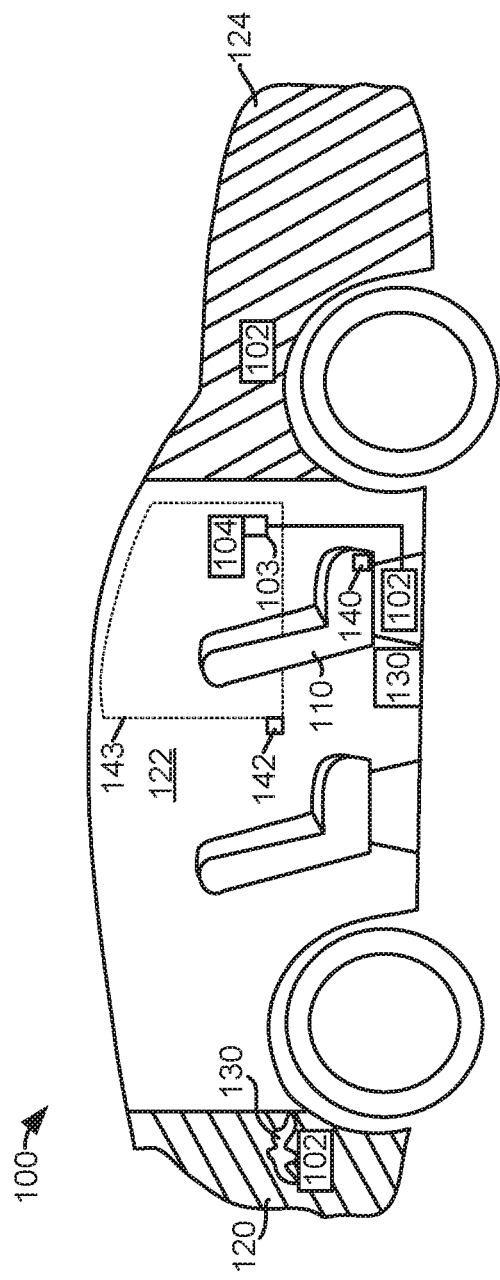
FIG. 1 is a schematic diagram of a vehicle that includes a DCAC converter.
Figure 2:
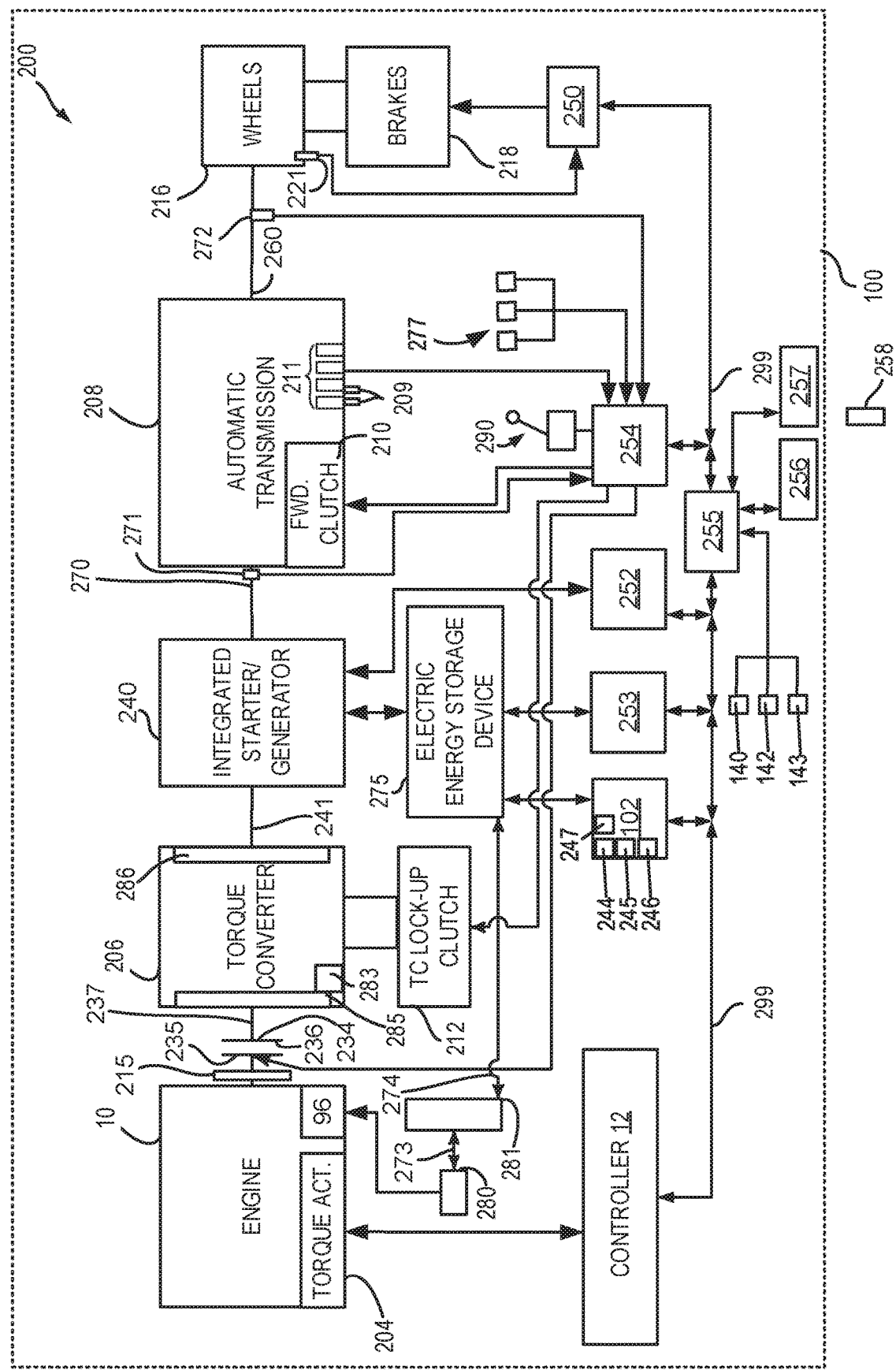
FIG. 2 is a schematic diagram of vehicle systems.
Figure 3B:
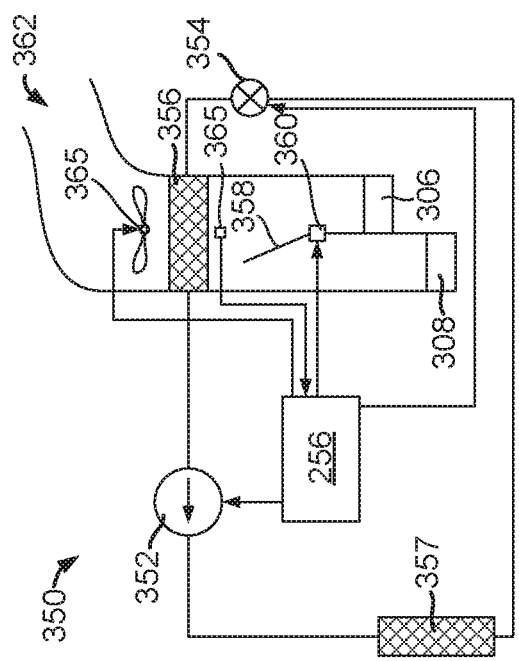
FIGS. 3A and 3B show schematic diagrams of an instrument panel and a climate control system.
Figure 3A:
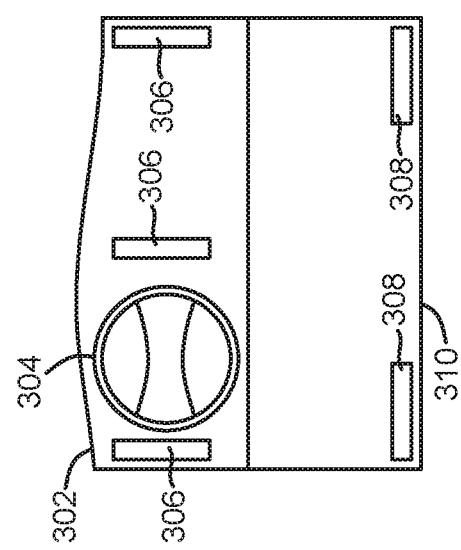
Figure 4:
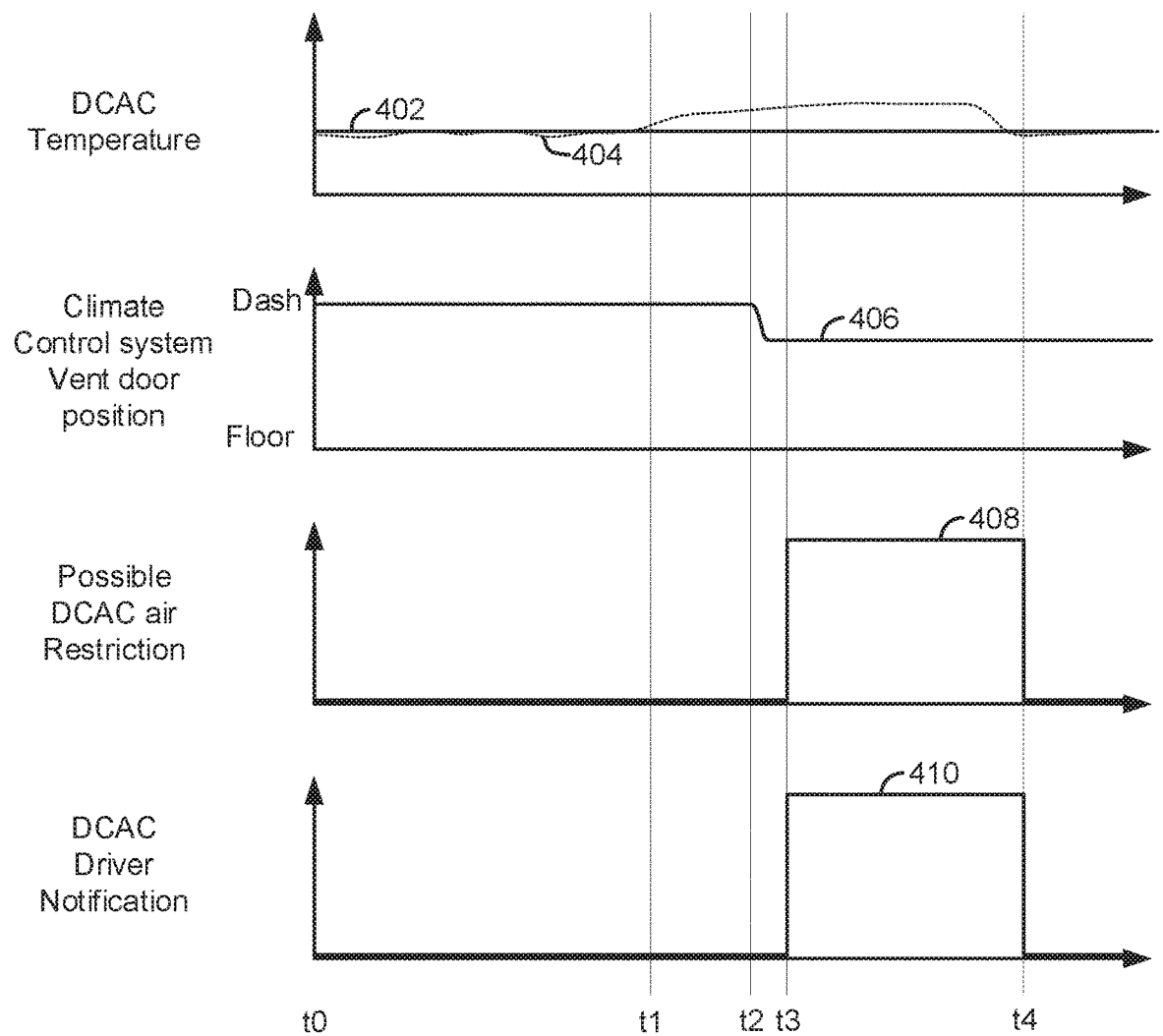
FIG. 4 shows an example DCAC converter operating sequence according to the method of FIG. 5.

The present description is related to operating a DCAC converter and vehicle systems that may operate in cooperation with the DCAC converter. The DCAC converter may be included in a vehicle as shown in FIG. 1. The DCAC converter may be incorporated with other vehicle systems as shown in FIG. 2. A vehicle climate control system as shown in FIGS. 3A and 3B may be operated to reduce the possibility of DCAC converter degradation. A DCAC converter may operate as shown in FIG. 4 according to the method of FIG. 5 to reduce the possibility of DCAC converter degradation.

Referring to FIG. 1, vehicle 100 is shown that includes a passenger compartment 122, a storage compartment 120 (e.g., a trunk or a rear interior area of a vehicle where seating is not included), and a powertrain compartment 124. Passenger compartment may include seats 110 and a receptacle 103 for providing AC power to AC power consumers 104. AC power consumers may include but are not limited to phones, computing devices, electronic note pads, gaming systems, lights, entertainment systems, and power tools. Receptacle 103 may receive AC electrical power from DCAC converter 102. DCAC converter 102 may be positioned in passenger compartment 122 and under seat 110. Alternatively, DCAC converter 102 may be positioned in storage compartment 120 or in powertrain compartment 124 as shown.

Air flow through and around DCAC converters 102 may be restricted via objects that have been brought into vehicle 100. For example, air flow to or through a DCAC converter 102 may be restricted via objects that are made of a fabric, such as blankets or clothing 130, or objects that are more rigid in composition 130, such as boxes or books. The restriction of air flow to and through the DCAC converter 102 may increase a temperature of the DCAC converter, and higher temperatures of the DCAC converter may result in DCAC converter performance degradation. Therefore, it may be desirable to determine if DCAC converter temperature is greater than may be expected.

DCAC converter temperature may be affected by a position of a window 143, which may be determined via window position sensor 142. Further, DCAC temperature may be affected by a position and/or occupancy of seat 110, which may be determined via seat position sensor 140. Further still, DCAC converter temperature may be affected by a speed of a DCAC fan, the amount of power supplied to the DCAC converter, the amount of power delivered by the DCAC converter, ambient air temperature, and climate control system status as will be discussed in further detail with regard to the descriptions of FIGS. 2 and 5.

FIG. 2 is a block diagram of a vehicle 100 including a powertrain or driveline 200. The powertrain of FIG. 2 includes an engine 10. Powertrain 200 is shown including vehicle system controller 255, engine controller 12, electric machine controller 252, transmission controller 254, energy storage device controller 253, climate controller 256, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, climate controller 256, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be different than that shown in FIG. 2. For example, a single controller may take the place of vehicle system controller 255, engine controller 12, electric machine controller 252, transmission controller 254, climate controller 256, and brake controller 250. Alternatively, the vehicle system controller 255 and the engine controller 12 may be a single unit while the electric machine controller 252, the transmission controller 254, climate controller 256, and the brake controller 250 are standalone controllers.

In this example, powertrain 200 may be powered by engine 10 and/or electric machine 240. Engine 10 may be started via optional engine starting system (e.g., a starter motor) or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96. DCAC converter 102 may receive DC power from electric energy storage device 275, or alternatively, via low voltage battery 280.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to torque converter impeller 285 via shaft 237. Disconnect clutch 236 may be fully closed when engine 10 is supplying power to vehicle wheels 216. Disconnect clutch 236 may be fully open when engine 10 is stopped (e.g., not combusting fuel).

Torque converter 206 includes a turbine 286 to output power to shaft 241. Input shaft 241 mechanically couples torque converter 206 to ISG 240. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission. Torque may be transferred via fluid from impeller 285 to 286.

When torque converter lock-up clutch 212 is fully disengaged, torque converter 206 transmits engine power to automatic transmission 208 via fluid transfer between the torque converter turbine 286 and torque converter impeller 285 or vice-versa, thereby enabling torque multiplication. In contrast, when torque converter lock-up clutch 212 is fully engaged, the engine output power may be directly transferred via the torque converter clutch to an input shaft 241 of ISG 240. Alternatively, the torque converter lock-up clutch 212 may be partially engaged, thereby enabling the amount of engine torque directly relayed to the ISG to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than a starter motor (not shown). Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the input shaft 270 of automatic transmission 208. The upstream side of the ISG 240 is mechanically coupled to the turbine 286 of torque converter 206. ISG 240 may provide a positive power or a negative power to powertrain 200 via operating as a motor or generator as instructed by electric machine controller 252.

ISG 240 may rotate turbine 286, which in turn may rotate impeller 285 to start engine 10 during engine starting. Torque converter 206 may multiply torque of ISG 240 to rotate engine 10 when driveline disconnect clutch 236 is fully closed. Thus, the torque of ISG 240 may be increased via torque converter 206 to rotate engine 10 during engine starting. TCC 212 may be fully open when ISG 240 is cranking engine 10 so that torque of ISG 240 may be multiplied. Alternatively, TCC 212 may be partially open when ISG 240 is cranking engine 10 to manage torque transfer to engine 10. ISG 240 may rotate at a greater speed than engine 10 during engine cranking.

Automatic transmission 208 includes gear clutches 211 (e.g., for gears 1-10) and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG. Vehicle system controller 255 requests the engine power from engine controller 12 and the ISG power from electric machine controller 252. If the engine power that flows through torque converter 206 and ISG power is less than a transmission input power limit (e.g., a threshold value not to be exceeded), the power is delivered to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, sensor for determining torque transferred via the transmission clutches, gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor (not shown) directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Vehicle system controller 255 may also command and receive data from climate controller 256. Climate controller 256 may control a temperature of passenger compartment 122 as discussed in further detail in the description of FIGS. 3A and 3B. Vehicle system controller may also determine a position of window 143 via window position sensor 142 and a position and/or occupancy of seat 110 via seat sensor 140. Vehicle system controller 255 may also determine ambient temperature via temperature sensor 143. Vehicle system controller 255 may also provide vehicle status information and indicate vehicle operating conditions to vehicle occupants via human/machine interface 257. Human/machine interface may be configured as a keyboard and display, touch screen, or other known human/machine interface. Further, vehicle system controller 255 may transmit vehicle status information and vehicle operating conditions to external electronic devices 258 (e.g., cell phone or electronic note pads).

DCAC converter 102 includes a cooling fan 247, power input sensors 244 (e.g., current and voltage sensors), power output sensors 245 (e.g., current and voltage sensors), and cooling fan speed sensor 246. DCAC converter 102 may relay DCAC operating conditions as determined via sensors 244, 245, and 246 to vehicle system controller 255. In addition, DCAC converter may adjust a speed of cooling fan 247 in response to instructions received from vehicle system controller 255.

Referring now to FIG. 3A, a schematic of a dashboard or instrument panel 302 of vehicle 100 is shown. Dashboard 302 includes a steering wheel 304, dashboard climate control vents 306, and floorboard climate control vents 308. The dashboard climate control vents 306 and the floorboard climate control vents 308 are included in climate control system 350 shown in FIG. 3B.

Dashboard climate control vents 306 may supply cooled or heated air to a chest area of vehicle occupants. Floorboard climate control vents 308 may supply cooled or heated air to the area of floor 310. The temperature of air that is supplied via vents 306 and 308 may be adjusted via the climate control system.

Referring now to FIG. 3B, climate control system 350 is shown. Climate control system 350 includes climate controller 256 that operates climate control system 350 to meet climate control requests that may be input via a human operator to human/machine interface 257 shown in FIG. 2. Climate control system 350 also includes a compressor 352, a first heat exchanger 357 (e.g., external heat exchanger), an expansion valve 354, a second heat exchanger 356 (e.g., an internal heat exchanger), fan 365, vent door 358, intake passage 362, floor vent 308, dashboard vent 306, and vent door actuator 360.

Climate control system 350 may operate in a cooling mode where second heat exchanger 356 operates as an evaporator and where first heat exchanger 357 operates as a condenser. Variable speed compressor 352 pressurizes refrigerant, the pressurized refrigerant may be cooled via the first heat exchanger into a pressurized liquid. The refrigerant may be expanded into a gas via expansion valve 354, thereby cooling the refrigerant and air that passes through second heat exchanger 356. The refrigerant may be heated as it passes through the second heat exchanger 356 and cools air passing through the second heat exchanger 356. The variable speed compressor 352 may compress the heated vaporized refrigerant to start the cycle again. Climate control system 350 may also operate in a heating mode in cases where climate control system 350 is a heat pump. A second expansion valve (not shown) may be included when climate control system 350 is a heat pump.

Warm air may enter intake passage 362 when climate control system 350 is operating in a cooling mode. Fan 365 may draw air into intake passage 362 and push the air through second heat exchanger 356 where the air may be cooled. The air may exit climate control system solely via floor vents 308, solely via dashboard vents 306, or via both floor vents 308 and dashboard vents 306 depending on the position of vent door 358. Vent door 358 is shown in a position where air is delivered via both the floor vents 308 and dashboard vents 306. The position of vent door 358 is adjusted via climate controller 256 and vent door actuator 360. Climate controller 256 may control a temperature of air exiting the floor vents 308 and dashboard vents 306 via adjusting a speed of variable speed compressor 352, a position of evaporator valve 354, and a speed of fan 365. Climate controller 256 may adjust the speed of variable speed compressor 352, a position of expansion valve, a position of vent door 358, and a speed of fan 365 via adjusting an amount of electrical current and voltage supplied to these actuators.

The system of FIGS. 1-3B provides for a system, comprising: a vehicle including a direct current to alternating current converter and a human/machine interface; and a controller including executable instructions stored in non-transitory memory to indicate a temperature of the direct current to alternating current converter is greater than a desired temperature via the human/machine interface. The system further comprises a climate control system and additional instructions to adjust the climate control system in response to the temperature of the direct current to alternating current converter being greater than the desired temperature. The system includes where adjusting the climate control system includes adjusting a position of a vent. The system includes where adjusting the climate control system includes adjusting a speed of a fan. The system includes where the human/machine interface is a phone.

Figure 5:
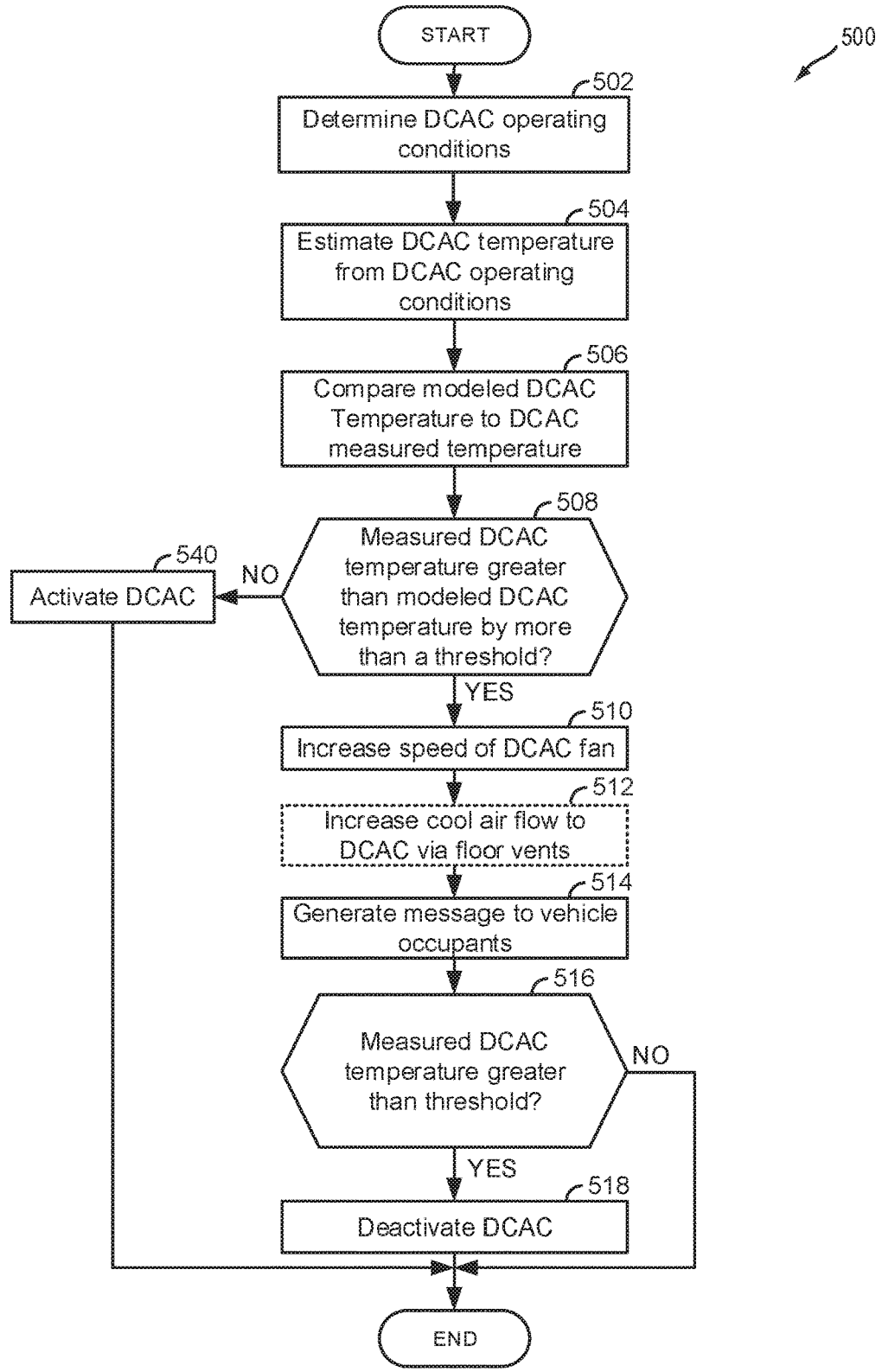
FIG. 5 shows an example method for operating a DCAC converter and vehicle systems that may be related to the DCAC converter.

Referring now to FIG. 4, plots of a prophetic DCAC converter operating sequence according to the method of FIG. 5 and the system of FIGS. 1-3B are shown. The plots are aligned in time and occur at a same time. The vertical lines at t0-t4 show particular times of interest.

The first plot from the top of FIG. 4 is a plot of a DCAC converter temperature versus time. The vertical axis represents the DCAC converter temperature and the DCAC converter temperature increases in the direction of the vertical axis arrow. The horizontal axis represents time and the time increases from the left side of the figure to the right side of the figure. Solid line trace 402 represents the values of a modeled DCAC converter temperature. Dashed-line trace 404 represents values of a measured DCAC converter temperature.

The second plot from the top of FIG. 4 is a plot of a position of a climate control system vent door (e.g., 358 of FIG. 3B) versus time. The vertical axis represents the position of the vent door and the vent door directs all air passing through the climate control system intake passage 362 through the dashboard vents 306 when trace 406 is near the "Dash" label. The vent door directs all air passing through the climate control system intake passage 362 through the floor vents 310 when trace 406 is near the "Floor" label. The vent door directs a portion of air passing through the climate control system intake passage 362 through the floor vents 310 and a portion of the air passing through the climate control system intake passage 362 through the dashboard vents 306 when trace 406 is between the "Floor" label and the "Dash" label. Trace 406 represents the position of a climate control system vent door.

The third plot from the top of FIG. 4 is a plot that shows an operating state that indicates when there may be an airflow restriction through or around the DCAC converter versus time. An indication that there may be an airflow restriction through or around the DCAC converter is present when trace 408 is at a higher level near the vertical axis arrow. There is not an indication that there is an airflow restriction through or around the DCAC converter when trace 408 is at a lower level near the horizontal axis. Trace 408 represents the state that indicates when there may be an airflow restriction through or around the DCAC converter.

The fourth plot from the top of FIG. 4 is a plot that shows an operating state that indicates when there is human driver notification that airflow through or around a DCAC converter may be restricted versus time. An indication to a human driver that there may be an airflow restriction through or around the DCAC converter is present when trace 410 is at a higher level near the vertical axis arrow. There is not an indication to a human driver that there may be an airflow restriction through or around the DCAC converter when trace 410 is at a lower level near the horizontal axis. Trace 410 represents the state indicates that a human driver may be notified that there may be an airflow restriction through or around the DCAC converter.

At time t0, the DCAC converter modeled and measured temperatures are at middle levels and there is very little difference between the two temperatures. The climate control system is directing all of the air that flows through the climate control system intake passage 362 to the dashboard vents 306. An indication of a possible airflow restriction through or around the DCAC converter is not asserted and notification of the same is not provided to a human driver. The DCAC converter is activated and it is supplying AC power to electrical power consumers (not shown).

At time t1, the measured or actual DCAC converter temperature exceeds the modeled DCAC converter temperature by more than a threshold amount. The climate control system is directing all of the air that flows through the climate control system intake passage 362 to the dashboard vents 306. An indication of a possible airflow restriction through or around the DCAC converter is not asserted and notification of the same is not provided to a human driver. The DCAC converter remains activated and it is supplying AC power to electrical power consumers (not shown).

At time t2, the measured or actual DCAC converter temperature exceeds the modeled DCAC converter temperature by a threshold amount for longer than a threshold amount of time. The climate control system adjusts a position of the climate control system vent door to direct cool air flow to the DCAC converter that is positioned under the seat to improve DCAC converter cooling. The position of the climate control system vent door may be adjusted to increase airflow to the DCAC converter by a small amount so that the change in airflow to the climate control system floor vents may go unnoticed by human occupants. An indication of a possible airflow restriction through or around the DCAC converter is not asserted and notification of the same is not provided to a human driver. The DCAC converter remains activated and it is supplying AC power to electrical power consumers (not shown).

Between time t2 and time t3, the measured DCAC converter temperature does not decline and the DCAC converter modeled temperature remains unchanged. An indication of a possible airflow restriction through or around the DCAC converter is not asserted and notification of the same is not provided to a human driver. The DCAC converter remains activated and it is supplying AC power to electrical power consumers (not shown).

At time t3, the measured DCAC converter temperature continues at a level that is above the DCAC converter modeled temperature. Consequently, an indication of a possible airflow restriction through or around the DCAC converter is asserted and notification of the same is provided to a human driver. The DCAC converter remains activated and it is supplying AC power to electrical power consumers (not shown).

Between time t3 and time t4, the vehicle occupants clear airflow to the DCAC converter (not shown) and measured DCAC converter temperature declines and the DCAC converter modeled temperature remains unchanged. An indication of a possible airflow restriction through or around the DCAC is asserted and notification of the same is provided to a human driver. The DCAC converter remains activated and it is supplying AC power to electrical power consumers (not shown).

At time t4, the measured DCAC converter temperature is less than the DCAC converter modeled temperature so the indication of a possible airflow restriction through or around the DCAC converter is no longer asserted and notification of the same is no longer provided to a human driver. The DCAC converter remains activated and it is supplying AC power to electrical power consumers (not shown).

In this way, vehicle occupants may be informed of DCAC converter operation so that they may take mitigating actions to reduce the possibility of DCAC converter degradation. Further, operation of the climate control system may be adjusted to reduce the possibility of DCAC degradation.

Referring now to FIG. 5, a flow chart of a method for operating a DCAC converter of a vehicle is shown. The method of FIG. 5 may be incorporated into and may cooperate with the system of FIGS. 1-3B. Further, at least portions of the method of FIG. 5 may be incorporated as executable instructions stored in non-transitory memory while other portions of the method may be performed via a controller transforming operating states of devices and actuators in the physical world.

At 502, the DCAC converter is activated (e.g., supplying electrical power to AC electrical power consumers) and DCAC converter operating conditions are determined. DCAC converter operating conditions may include but are not limited to an amount of DC power input to the DCAC converter, an amount of AC power supplied by the DCAC converter, DCAC converter cooling fan speed, window position, seat position, status of seat occupancy, ambient temperature, and climate control system status. Method 500 may determine these operating conditions via the sensors shown in FIGS. 1-3B and algorithms that may be included in one or more controllers. Method 500 proceeds to 504.

At 504, method 500 measures a DCAC converter temperature and estimates DCAC temperature via a model. In one example, the DCAC converter temperature model may be based on empirically determined data recorded during DCAC converter operation. The DCAC converter temperature may be a function of DC power input to the DCAC converter and AC power output from the DCAC converter. For example, a baseline DCAC temperature may be determined via the following equation:

$$DCAC\_base\_temp = f(DCAC\_in\_pow, DCAC\_out\_pow)$$

where DCAC_base_temp is a baseline DCAC converter temperature, f is a function, DCAC_in_pow is an argument comprising DCAC converter DC input power amount, and DCAC_out_pow is DCAC converter AC output power amount. In one example, the function f may be comprised of a table or function of empirically determined values that is indexed or referenced via DCAC converter DC input power and DCAC converter AC output power. The final DCAC temperature may be determined via the following equation:

$$DCAC\_temp = DCAC\_base\_temp \cdot f1(win\_pos) \cdot f2(seat\_pos) \cdot f3(seat\_occ) \cdot f4(fan\_spd) \cdot f5(amb\_t) \cdot f6(clim\_mod)$$

where DCAC_temp is the modeled DCAC converter temperature, f1 is a function that returns a scalar multiplier that is based on a position of a vehicle's window (e.g., f1 may output a fractional value if the window is open and a value of 1 if the window is closed), win_pos represents window position, f2 is a function that returns a scalar multiplier that is based on seat position (e.g., f2 may output a value that is greater than 1 if the seat position tends to block air flow through and/or around the DCAC converter), seat_pos represents the seat position, f3 is a function that returns a scalar multiplier that is based on seat occupancy (e.g., f1 may output a value that is greater than 1 if the seat is occupied so that air flow through and/or around the DCAC converter tends to be blocked when the seat is occupied), seat_occ represents the seat occupancy, f4 is a function that returns a scalar multiplier that is based on DCAC converter fan speed (e.g., f4 may output a value that is greater than 1 if the fan speed is slower than is expected), fan_spd represents the DCAC fan speed, f5 is a function that returns a scalar multiplier that is based on ambient temperature (e.g., f5 may output a value that is greater than 1 if the ambient temperature is greater than 25° C.), amb_t represents the ambient temperature, f6 is a function that returns a scalar multiplier that is based on climate control system mode (e.g., f6 may output a value that is less than 1 if the climate control system is operating in a cooling mode), clim_mod represents the climate control system operating mode. Method 500 proceeds to 506.

At 506, method 500 compares the modeled DCAC converter temperature to the measured DCAC converter temperature. In particular, method 500 determines if the measured DCAC temperature is greater than the modeled DCAC converter temperature by more than a threshold temperature amount for longer than a threshold amount of time (e.g., one minute). Alternatively, method 500 may determine if the derivative of the measured DCAC converter temperature is greater than the derivative of modeled DCAC converter temperature by more than a threshold amount for longer than a threshold amount of time (e.g., one minute). Method 500 proceeds to 508.

At 508, method 500 judges if the measured DCAC converter temperature is greater than the modeled DCAC converter temperature by more than a threshold temperature. If so, the answer is yes and method 500 proceeds to 510. Otherwise, the answer is no and method 500 proceeds to 540.

At 540, method 500 activates the DCAC converter and begins suppling AC power to AC power consumers if the DCAC converter is not already activated. Method 500 proceeds to exit.

At 510, method 500 increases a speed of a DCAC converter fan to increase airflow to the DCAC converter. Method 500 proceeds to 512.

At 512, method 500 may optionally adjust operating of a climate control system to reduce DCAC converter temperature. For example, method 500 may adjust one or more of a position of a climate control system door (e.g., 358 of FIG. 3B), adjust climate control compressor speed, and adjust a position of an expansion valve to improve DCAC converter cooling. By adjusting a position of the climate control system door, additional air may be directed to the DCAC converter to improve DCAC converter cooling for DCAC converters that may be mounted on a vehicle passenger compartment floor. Further, by increasing climate control system compressor speed and expansion valve position, cooler air may be supplied to the DCAC converter so that DCAC converter operation may continue and so that the DCAC converter may not degrade. Method 500 proceeds to 514.

At 514, method 500 provides an indication of possible DCAC converter low airflow. In one example, the indication may be provided a threshold amount of time after steps 510 and 512 are performed and a DCAC converter temperature reduction of a threshold amount has not occurred. The indication may be generated via a human/machine interface (e.g., 257 of FIG. 2) or via a portable device (e.g., 258 of FIG. 2). Method 500 proceeds to 516.

At 516, method 500 judges if the measured the DCAC converter temperature is greater than a threshold temperature. If so, the answer is yes and method 500 proceeds to 518. Otherwise, the answer is no and method 500 proceeds to exit.

At 518, method 500 deactivates the DCAC converter. The DCAC converter may be deactivated by ceasing to supply DC power to the DCAC converter. The DCAC converter may be deactivated to reduce the possibility of DCAC converter degradation. Method 500 proceeds to exit.

In this way, mitigating actions to reduce the possibility of DCAC converter degradation may be performed. Fan speeds and climate control devices may be automatically adjusted to reduce the possibility of DCAC converter degradation and to extend DCAC converter operation. If the automatic actions are not as successful as may be desired, then humans may be notified of a possible airflow restriction to the DCAC converter. If the DCAC temperature is not reduced to a desired level, then the DCAC may be deactivated to reduce the possibility of DCAC degradation.

Thus, the method of FIG. 5 provides for a method for operating a vehicle that includes a direct current to alternating current converter, comprising: modeling a temperature of the direct current to alternating current converter via a controller; measuring the temperature of the direct current to alternating current converter via the controller; and generating an indication to clear an air flow path to the direct current to alternating current converter in response to the measured temperature being greater than the modeled temperature for greater than a threshold amount of time. The method includes where the modeled temperature is a function of a position of a window. The method includes where the modeled temperature is a function of ambient temperature. The method includes where the modeled temperature is a function of a seat position. The method includes where the modeled temperature is a function of a speed of a fan of the direct current to alternating current converter. The method includes where the modeled temperature is a function of power input to the direct current to alternating current converter. The method includes where the modeled temperature is a function of power output from the direct current to alternating current converter. The method includes where the indication is presented via a human to machine interface. The method includes where the indication is presented via a personal communications device.

The method of FIG. 5 also provides for a method for operating a vehicle that includes a direct current to alternating current converter or converter, comprising: adjusting a climate control system via a controller in response to a temperature of a direct current to alternating current converter. The method includes where adjusting the climate control system includes adjusting a position of a vent control valve. The method includes where adjusting the position of the vent control valve increases air flow to floor vents. The method includes where adjusting the climate control system includes adjusting a speed of a climate control system fan. The method further comprises adjusting a speed of a fan of the direct current to alternating current converter. The method includes where adjusting the climate control system includes adjusting a speed of a compressor.

In another representation, the method of FIG. 5 also provides for operating a vehicle that includes a direct current to alternating current converter, comprising: adjusting a fan speed of a direct current to alternating current converter in response to a measured temperature of the direct current to alternating current converter being greater than a modeled temperature for greater than a threshold amount of time. The method includes where the modeled temperature is a function of a position of a window. The method includes where the modeled temperature is a function of ambient temperature. The method includes where the modeled temperature is a function of a seat position. The method includes where the modeled temperature is a function of a speed of a fan of the direct current to alternating current converter. The method further includes adjusting a position of a climate control vent door in response to the modeled temperature of the direct current to alternating current converter being greater than a measured temperature for greater than a threshold amount of time.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating a vehicle that includes a direct current to alternating current converter, comprising:
   modeling a temperature of the direct current to alternating current converter via a controller;
   measuring the temperature of the direct current to alternating current converter via the controller; and
   generating an indication to clear an air flow path to the direct current to alternating current converter in response to the measured temperature being greater than the modeled temperature for greater than a threshold amount of time, wherein the modeled temperature is a function of a position of a window.

2. The method of claim 1, where the modeled temperature is further a function of one or more of ambient temperature, a seat position, power input to the direct current to alternating current converter, and power output from the direct current to alternating current converter.

3. The method of claim 1, where the indication is presented via a human to machine interface.

4. The method of claim 1, where the indication is presented via a personal communications device.

5. A method for operating a vehicle that includes a direct current to alternating current converter, comprising:
   modeling a temperature of the direct current to alternating current converter via a controller;
   measuring the temperature of the direct current to alternating current converter via the controller; and
   generating an indication to clear an air flow path to the direct current to alternating current converter in response to the measured temperature being greater than the modeled temperature for greater than a threshold amount of time, where the modeled temperature is a function of a seat position.

6. The method of claim 5, where the modeled temperature is further a function of a speed of a fan of the direct current to alternating current converter.

7. The method of claim 5, where the modeled temperature is further a function of power input to the direct current to alternating current converter.

8. The method of claim 5, where the modeled temperature is further a function of power output from the direct current to alternating current converter.

9. A method for operating a vehicle that includes a direct current to alternating current converter, comprising:
   adjusting a climate control system via a controller in response to a temperature of a direct current to alternating current converter, where adjusting the climate control system includes adjusting a position of a vent control valve.

10. The method of claim 9, where adjusting the position of the vent control valve increases air flow to floor vents.

11. The method of claim 9, where adjusting the climate control system includes adjusting a speed of a climate control system fan.

12. The method of claim 9, further comprising adjusting a speed of a fan of the direct current to alternating current converter.

13. The method of claim 9, where adjusting the climate control system includes adjusting a speed of a compressor.

14. A system, comprising:
   a vehicle including a direct current to alternating current converter and a human/machine interface;
   a climate control system; and
   a controller including executable instructions stored in non-transitory memory to indicate a temperature of the direct current to alternating current converter is greater than a desired temperature via the human/machine interface, and adjusting the climate control system by adjusting a position of a vent;
   where the vent is adjusted in response to the temperature of the direct current to alternating current converter being greater than the desired temperature.

15. The system of claim 14, where adjusting the climate control system further includes adjusting a speed of a fan.

16. The system of claim 14, where the human/machine interface is a phone.

* * * * *